(12) United States Patent
Yoshimoto et al.

(10) Patent No.: US 6,381,126 B1
(45) Date of Patent: Apr. 30, 2002

(54) COVER WITH VIEWING WINDOW FOR PALMTOP COMPUTER

(75) Inventors: Max Yoshimoto; Maaike Evers; David Christopher, all of San Francisco; Heather Klaubert, Redwood City, all of CA (US)

(73) Assignee: Palm, Inc., Santa Clara, CA (US)

( * ) Notice: Subject to any disclaimer, the term of this patent is extended or adjusted under 35 U.S.C. 154(b) by 0 days.

(21) Appl. No.: 09/570,362

(22) Filed: May 12, 2000

(51) Int. Cl.[7] .................................................. G06F 1/16
(52) U.S. Cl. ........................ 361/683; 361/759; 312/216; 70/57
(58) Field of Search ................................ 361/683–686, 361/724–727, 740, 759; 248/551–553; 312/216, 218; 70/57–58, 85; 292/42, 148, 151, 307 R

(56) References Cited

U.S. PATENT DOCUMENTS 6,052,279 A * 4/2000 Friend et al. ................. 361/686
6,056,129 A * 5/2000 Ahearn et al. ............... 312/209
6,104,617 A * 8/2000 Schremmer ................. 361/737
6,115,248 A * 9/2000 Canova et al. .............. 361/686

* cited by examiner

*Primary Examiner*—Leo P. Picard
*Assistant Examiner*—Hung Van Duong
(74) *Attorney, Agent, or Firm*—Wagner, Murabito & Hao LLP

(57) ABSTRACT

A lid assembly that includes a lid and a coupling mechanism for coupling the lid to a palmtop computer system. The coupling mechanism is double jointed so as to move the lid from a closed position to an open position. In one embodiment, the coupling mechanism includes a plate and two clips that attach to the plate such that the clips rotate relative to the plate. The plate couples to the lid such that the lid rotates relative to the plate. In the closed position, the lid covers the display of the palmtop computer system. The lid is movable into the open position. In the open position, the display is uncovered and the lid is disposed against the rear side of the palmtop computer system. In one embodiment, the lid includes an opaque region and a non-opaque region. The non-opaque region allows for viewing a portion of the display of the palmtop computer while the lid is in the closed position.

20 Claims, 18 Drawing Sheets

100a

COVER WITH VIEWING WINDOW FOR PALMTOP COMPUTER

BACKGROUND OF THE INVENTION

1. Field of the Invention

The present invention relates to the field of computer systems. The present invention can relate to the field of palmtop computers. More specifically, the present invention discloses a lid assembly and method for covering a display screen ("display") of a portable computer.

2. Related Art

As the components required to build a computer system have reduced in size, new categories of computer systems have emerged. One of the new categories of computer systems is the "palmtop" computer system. A palmtop computer system is a computer that is small enough to be held in the hand of a user and can be "palm-sized." Most palmtop computer systems are used to implement various Personal Information Management (PIM) applications such as an address book, a daily organizer and electronic notepads, to name a few.

Palmtop computer systems typically include a display that is disposed in the front of the palmtop computer system. Input is typically achieved using either a stylus, a touch screen, or a small keypad.

Palmtop computer systems are designed to be carried in a user's pocket or purse. However, when palmtop computer systems are carried in a pocket or purse that includes sharp items such as pens, pencils, keys, etc., damage to the display can occur.

In an effort to limit damage to the display, palmtop computer system manufacturers have developed covers that attach to the palmtop computer system and that cover the display. Some covers include lids that flip up to expose the display. Others are flexible cloth or leather flaps. These prior art covers are typically effective for protecting the display. However, many prior art covers get in the way while a user is attempting to use the palmtop computer system and/or view the display.

Prior art covers typically are disposed over the entire display area and are formed of opaque material such that the display is not visible when the cover is disposed over the display. Therefore, such prior art covers do not allow for the user to view any of the display when the cover is disposed over the display. However, in some instances it can be desirable to view portions of the display while the display is covered.

What is needed is a cover for a palmtop computer system that is effective for protecting a display. Also, a cover for a palmtop computer is needed that does not get in the way while the user is attempting to use the palmtop computer and/or view the display. In addition, a cover is needed that allows a user to view at least some of the display while the cover is disposed over the display.

SUMMARY OF THE INVENTION

The present invention provides a method and apparatus for covering the display of a palmtop computer system that is effective for protecting the display. Also, the cover for a palmtop computer of the present invention does not get in the way while the user is attempting to use the palmtop computer and/or view the display. The present invention provides these advantages and others not specifically mentioned above but described in the sections to follow.

A lid assembly that includes a lid and a coupling mechanism for coupling the lid to a portable computer system are disclosed. In the present embodiment, a palmtop computer system is disclosed that includes two openings that extend through the top of the palmtop computer system. The coupling mechanism includes two clips that engage the two openings so as to couple the lid assembly to the palmtop computer system.

In one embodiment, a coupling mechanism is disclosed that includes a plate and a pin that attaches to the plate. In the present embodiment, the clips attach to opposite ends of the pin. The pin attaches to the plate such that the pin and the clips rotate relative to the plate. The plate couples to the lid such that the lid also rotates relative to the plate. This produces a lid assembly that is double-jointed.

The double-jointed lid assembly of the present invention allows the lid to be moved from the closed position into the open position. In the closed position, the lid covers the display and is effective for protecting the display.

In the open position, the display is uncovered and the lid is disposed against the rear side of the palmtop computer system. Because the lid is disposed against the rear side of the palmtop computer system, the lid is not in the way during the operation of the palmtop computer system. In addition, because the lid is disposed against the rear side of the palmtop computer system, the palmtop computer system can be easily grasped, holding the lid in the open position and allowing for easy operation of the palmtop computer system. Similarly, when the palmtop computer system is placed on a desk or other flat surface when the lid is in the open position, the lid is held in position against the rear side of the palmtop computer system (e.g., held between the desk and the rear of the palmtop computer system), keeping the lid out of the way of the user.

Because the lid of the present invention is held against the rear side of the palmtop computer when the palmtop computer is grasped by a user or when the palmtop computer is set down, the lid does not move so as to get in the user's way. Therefore, the method and apparatus of the present invention do not get in the way while the user is attempting to use the palmtop computer and/or view the display.

In one embodiment of the present invention, the lid includes an opaque region and a non-opaque region. The non-opaque region forms a viewing window that allows for viewing a portion of the display of the palmtop computer while the lid is in the closed position.

These and other objects and advantages of the present invention will become obvious to those of ordinary skill in the art after having read the following detailed description of the preferred embodiments that are illustrated in the various drawing figures.

DETAILED DESCRIPTION OF THE INVENTION

In the following detailed description of the present invention, a method for covering a display, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

NOTATION AND NOMENCLATURE

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "providing" or "computing" or "suspending" or "resuming" or "determining" or "calculating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

COVERING A DISPLAY OF A PALMTOP COMPUTER IN ACCORDANCE WITH THE PRESENT INVENTION

Figure 1:
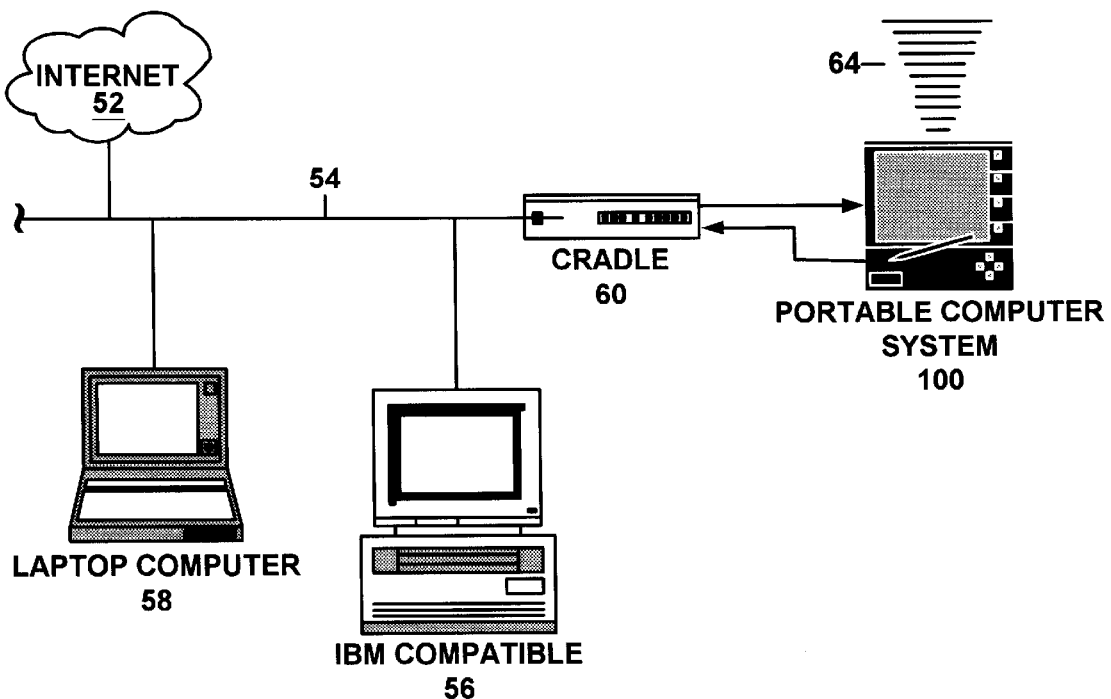
FIG. 1 is system illustration of a palmtop computer system connected to other computer systems and the Internet via a cradle device.

FIG. 1 illustrates a system 50 that can be used in conjunction with the method for covering a display of the present invention. It is appreciated that system 50 is exemplary only and that other systems could also be used. System 50 comprises a host computer system 56 which can either be a desktop unit as shown, or, alternatively, can be a laptop system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well known protocols.

Bus 54 is also coupled to a cradle 60 for receiving and initiating communication with portable computer system 100 of the present invention. Cradle 60 provides an electrical and mechanical communication interface between bus 54 (and anything coupled to bus 54) and the portable computer system 100 for two way communications. Portable computer system 100 also contains a wireless infrared communication mechanism 64 for sending and receiving information from other devices.

Figure 2:
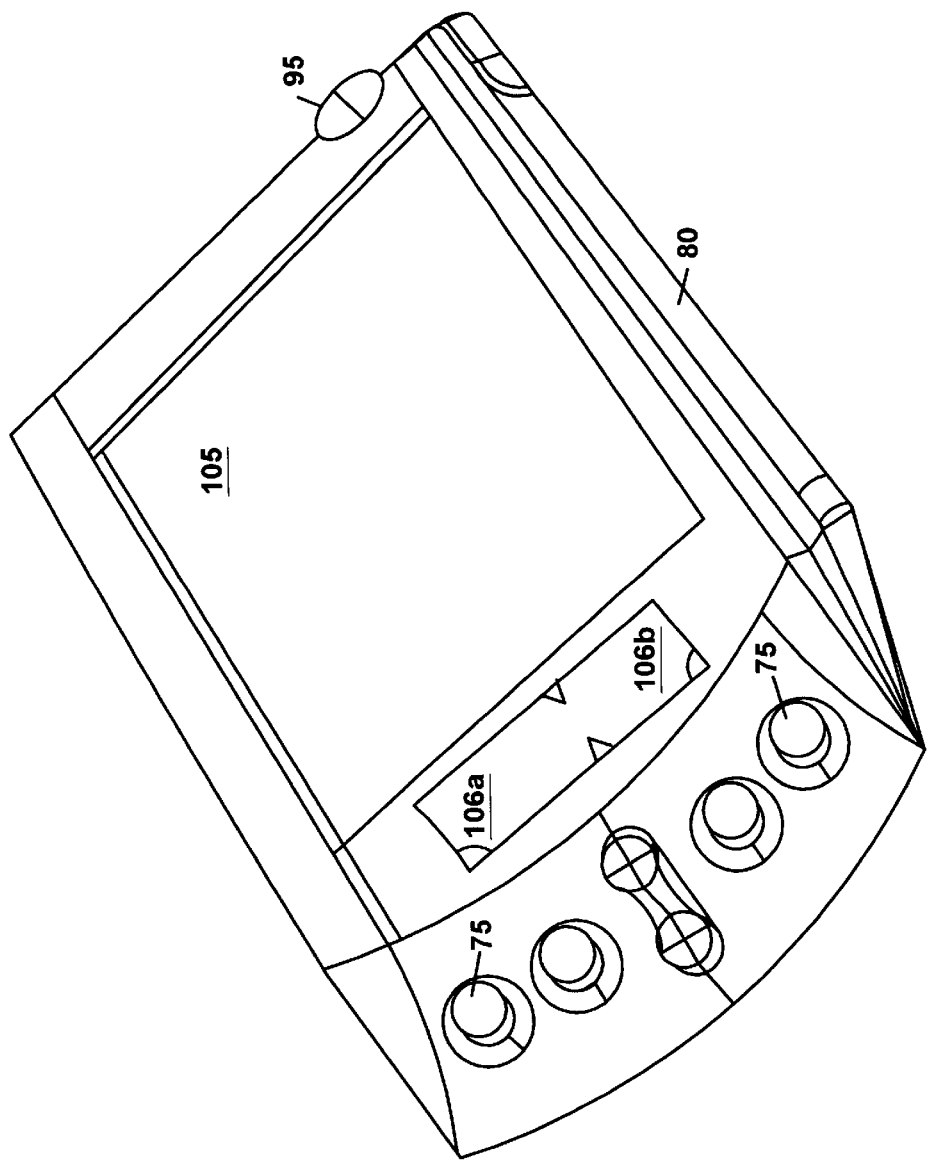
FIG. 2 is a front perspective view of a palmtop computer system in accordance with one embodiment of the present invention.

FIG. 2 is a perspective illustration of an embodiment in which portable computer system 100 of. FIG. 1 is a palmtop ("palm-sized") computer system 100a. The top face of palmtop computer system 100a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. Palmtop computer system 100a also contains one or more dedicated and/or programmable buttons 75 for selecting information and causing the computer system to implement functions. The on/off button 95 is also shown. FIG. 2 also illustrates a handwriting recognition pad or "digitizer" containing two regions 106a and 106b. Region 106a is for the drawing of alpha characters therein for automatic recognition and region 106b is for the drawing of numeric characters therein for automatic recognition. The stylus 80 is used for stroking a character within one of the regions 1 06a and 106b.

Figure 3:
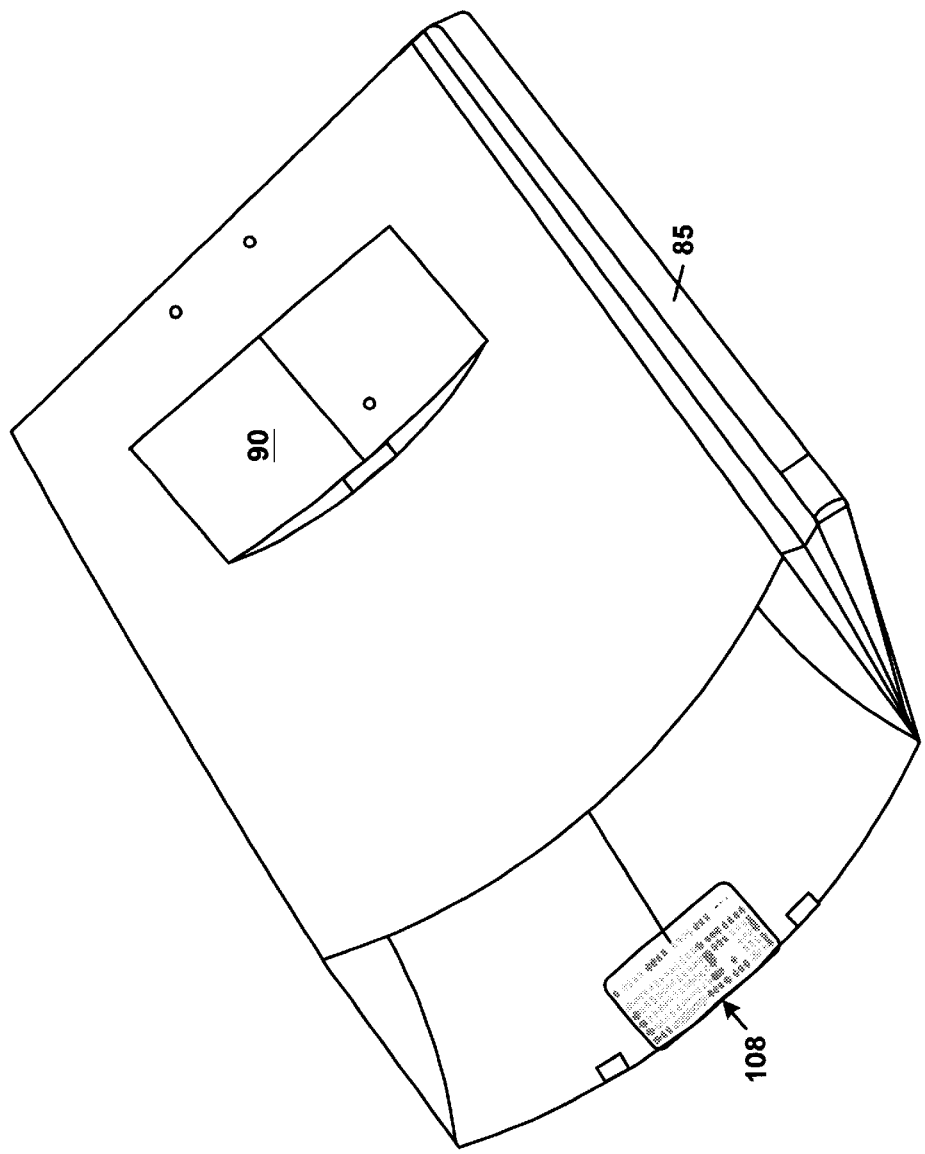
FIG. 3 is a rear perspective view of the palmtop computer system of FIG. 2.

FIG. 3 shows the bottom side of palmtop computer system 100a to include optional extendible antenna 85 and battery storage compartment door 90. A communication interface 108 is also shown. In one embodiment of the present invention, the serial communication interface 108 is a serial communication port, but could also alternatively be of any of a number of well known communication standards and protocols, e.g., parallel, SCSI, Firewire (IEEE 1394), Ethernet, etc.

Figure 4:
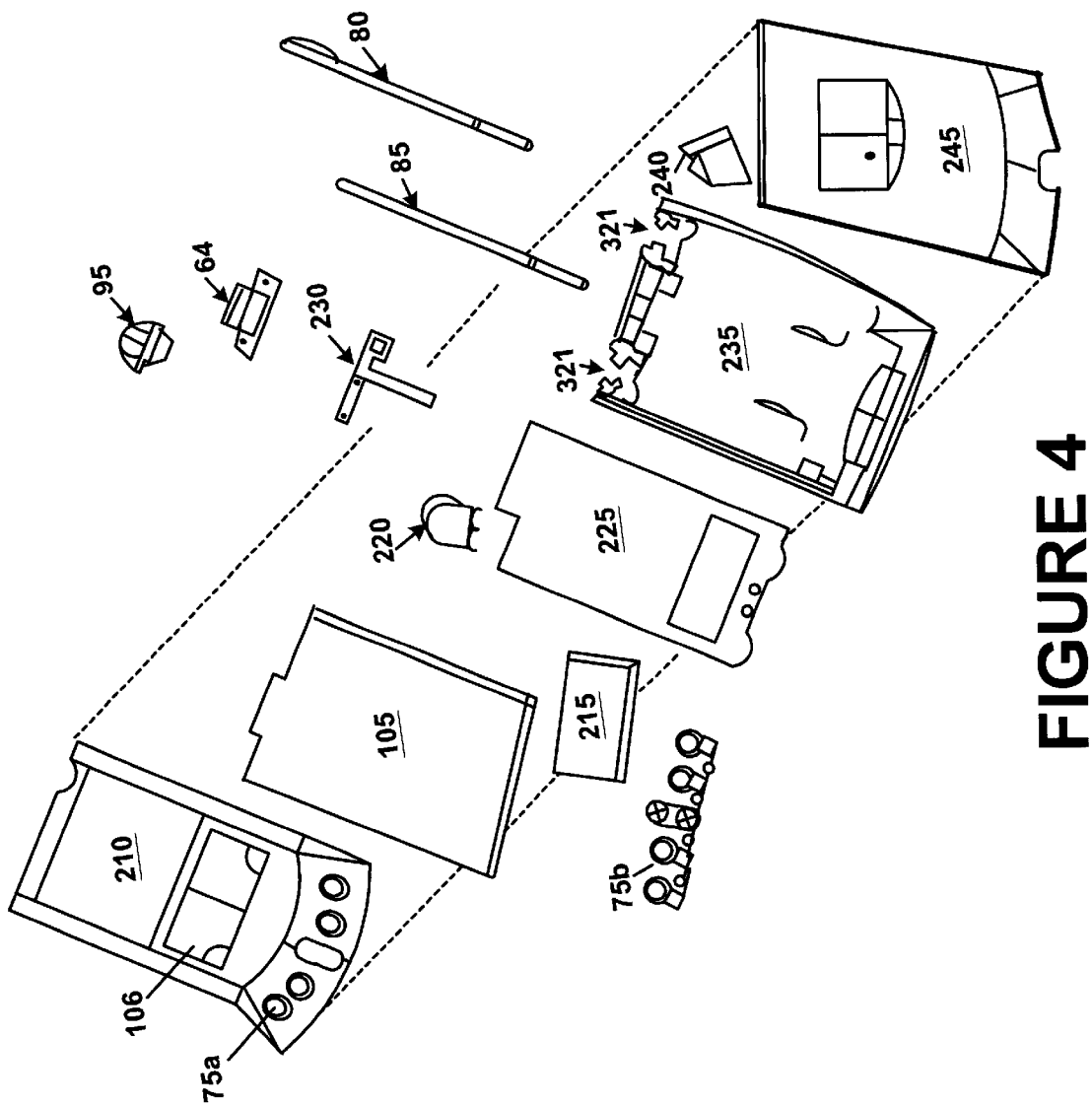
FIG. 4 is an exploded view of the components of the palmtop computer system of FIG. 2.

FIG. 4 is an exploded view of the palmtop computer system 100a in accordance with one implementation. Palmtop computer system 100a contains a front cover 210 having an outline of region 106 and holes 75a for receiving buttons 75b. A flat panel display 105 (both liquid crystal display and touch screen) fits into front cover 210. Any of a number of display technologies can be used, e.g., LCD, FED, plasma, etc., for the flat panel display 105. A battery 215 provides electrical power and can be rechargeable. A contrast adjustment (potentiometer) 220 is also shown. On/off button 95 is shown along with an infrared emitter and detector device 64. A flex circuit 230 is shown along with a PC board 225 containing electronics and logic (e.g., memory, communication bus, processor, etc.) for implementing computer system functionality. The digitizer pad is also included in PC board 225. Position adjustable antenna 85 and stylus 80 are also shown. Midframe 235 is shown to include openings 321 that are disposed in the top thereof. In the present embodiment, openings 321 are provided for coupling to lid assembly 300 of the present invention.

A radio receiver/transmitter device 240 is also shown between the midframe 235 and the rear cover 245 of FIG. 3. The receiver/transmitter device 240 is coupled to the antenna 85 and also coupled to communicate with the PC board 225. In one implementation the Mobitex wireless communication system is used to provide two way communication between palmtop computer system 100a and other networked computers and/or the Internet via a proxy server.

Figure 5:
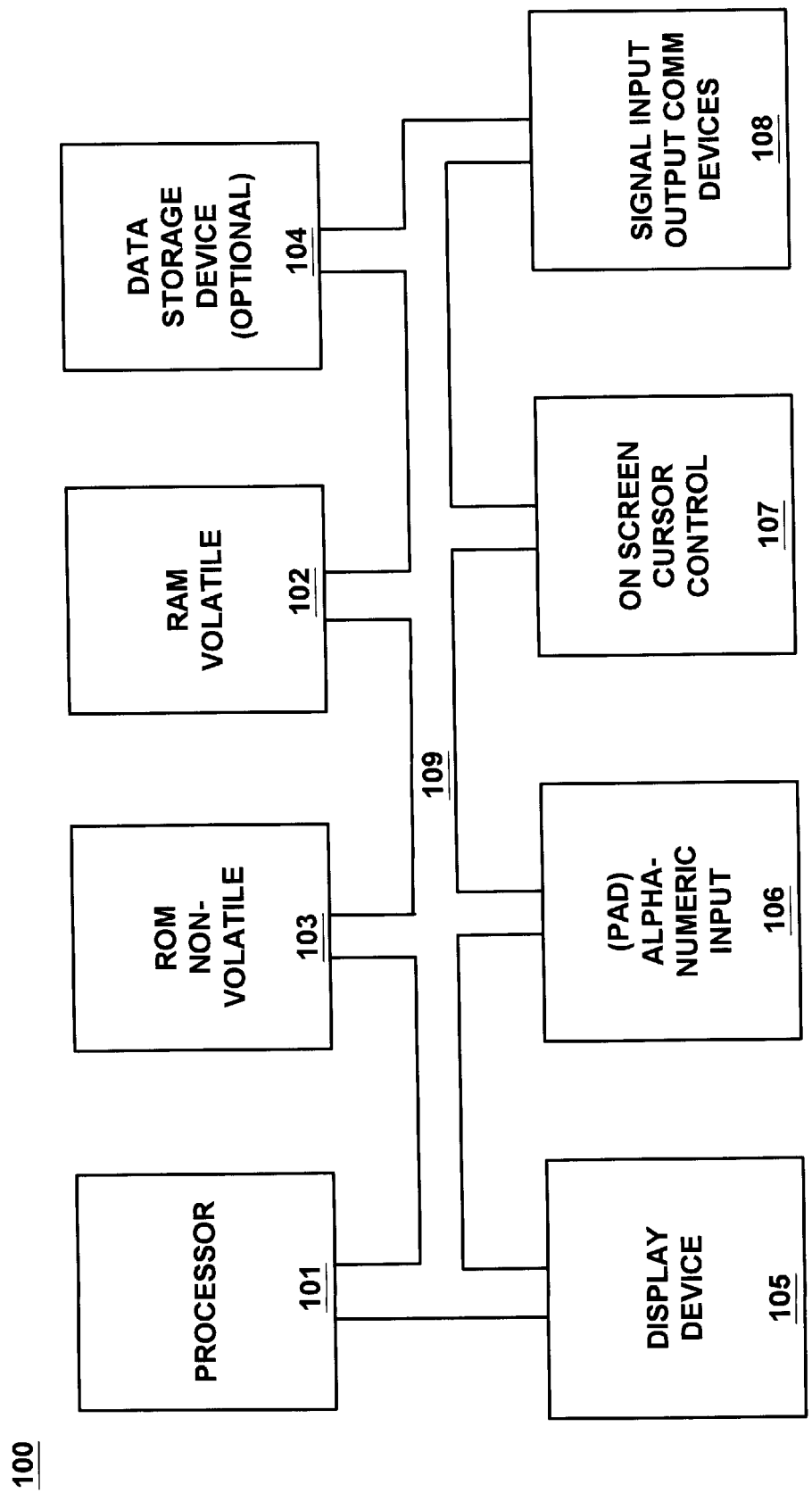
FIG. 5 is a logical block diagram of an exemplary computer system in accordance with an embodiment of the present invention.

FIG. 5 illustrates circuitry of an exemplary portable computer system 100, some of which can be implemented on PC board 225. Computer system 100 includes an address/data bus 109 for communicating information, a central processor 101 coupled with the bus for processing information and instructions, a volatile memory 102 (e.g., random access memory RAM) coupled with the bus 109 for storing information and instructions for the central processor 101 and a non-volatile memory 103 (e.g., read only memory ROM) coupled with the bus 109 for storing static information and instructions for the processor 101. Portable computer system 100 also includes an optional data storage device 104 (e.g., memory stick) coupled with the bus 109 for storing information and instructions. Device 104 can be removable. As described above, portable computer system 100 also contains a display device 105 coupled to the bus 109 for displaying information to the computer user. PC board 225 can contain the processor 101, the bus 109, the ROM 103 and the RAM 102.

Also included in portable computer system 100 of FIG. 5 is an optional alphanumeric input device 106 which in one implementation is a handwriting recognition pad ("digitizer") having regions 106a and 106b (FIG. 2A), for instance. Device 106 can communicate information and command selections to the central processor 101. Portable computer system 100 also includes an optional cursor control or directing device 107 coupled to the bus for communicating user input information and command selections to the central processor 101. In one implementation, device 107 is a touch screen device incorporated with screen 105. Device 107 is capable of registering a position on the screen 105 where the stylus makes contact. The display device 105 utilized with the portable computer system 100 may be a liquid crystal device, cathode ray tube (CRT), field emission device (FED), also called flat panel CRT) or other display device suitable for creating graphic images and alphanumeric characters recognizable to the user. In the preferred embodiment, display 105 is a flat panel display.

Continuing with FIG. 5, signal communication device 108, also coupled to bus 109, can be a serial port for communicating with cradle 60 of FIG. 1. Serial communication device 108 can also include an infrared communication port.

Figure 6:
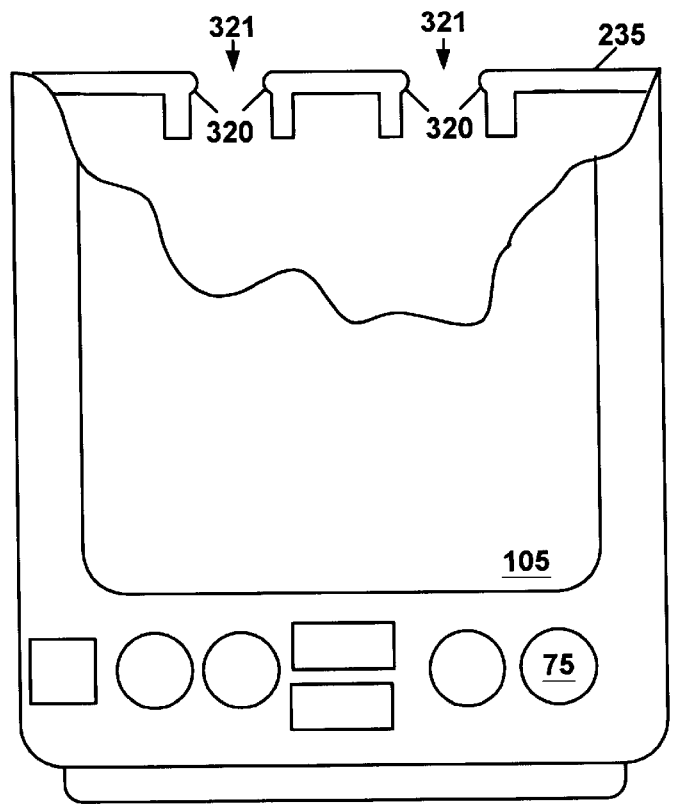
FIG. 6 is a front view of a palmtop computer system in accordance with an embodiment of the present invention.

FIG. 6 shows an embodiment of palmtop computer system 100a that includes two openings 321 that extend through midframe 325. Midframe 325 forms a narrow channel at each of openings 321, with detents 320 extending from each side of the channel. The channels formed by openings 321, and detents 320 are adapted to couple lid assembly 300 of FIGS. 7–13C to palmtop computer system 100a.

Figure 7:
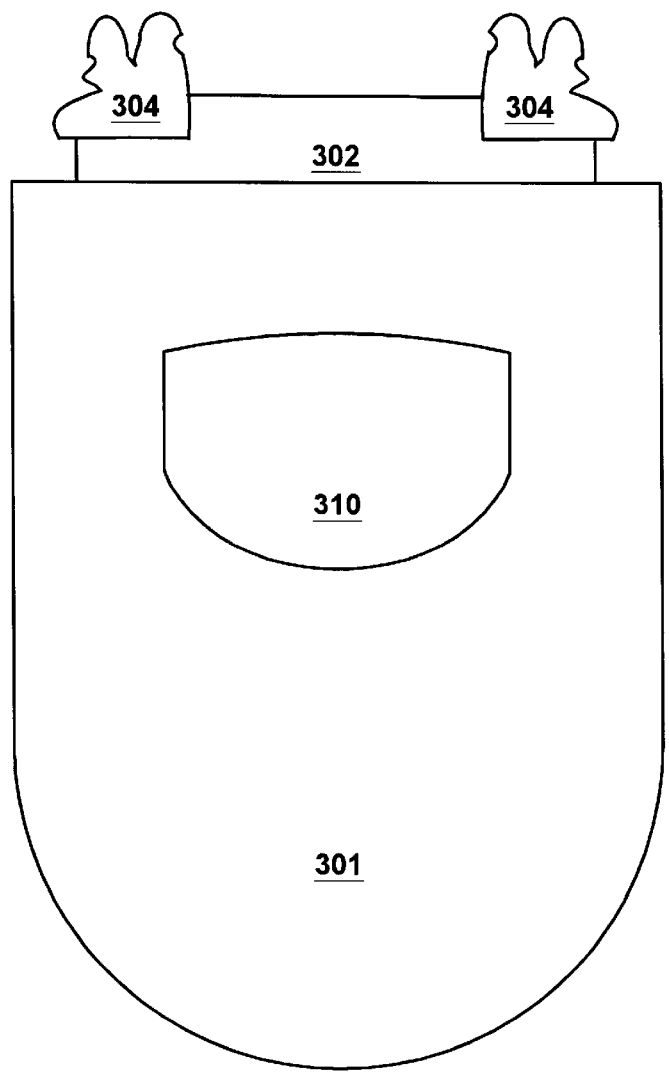
FIG. 7 is a front view of a lid assembly in accordance with an embodiment of the present invention.

FIG. 7 shows lid assembly 300 that can be attached to computer system 100a of FIG. 6 for protecting display 105. In the present embodiment, display assembly 300 includes lid 301, plate 302, and clips 304. Clips 304 are adapted to engage openings 321 of FIG. 6 for attaching lid assembly 300 to palmtop computer system 100a. In the present embodiment, lid 301 includes window 310.

The cover for a portable computer of the present invention can include other types of coupling mechanisms for coupling a lid to a portable computer. Other coupling mechanisms include, for example, hinges, bolt and socket connections, pin and hole connections, etc.

Figure 8:
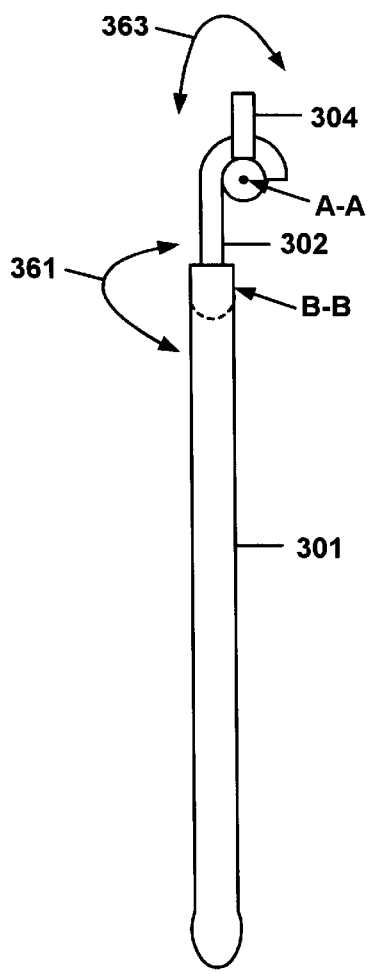
FIG. 8 is a right side view of a lid assembly in accordance with an embodiment of the present invention.

Referring now to FIG. 8, plate 302 rotates relative to clip 304 about axis A—A as shown by arrow 363. Similarly lid 301 rotates relative to plate 302 about axis B—B as shown by arrow 361.

Figure 9:
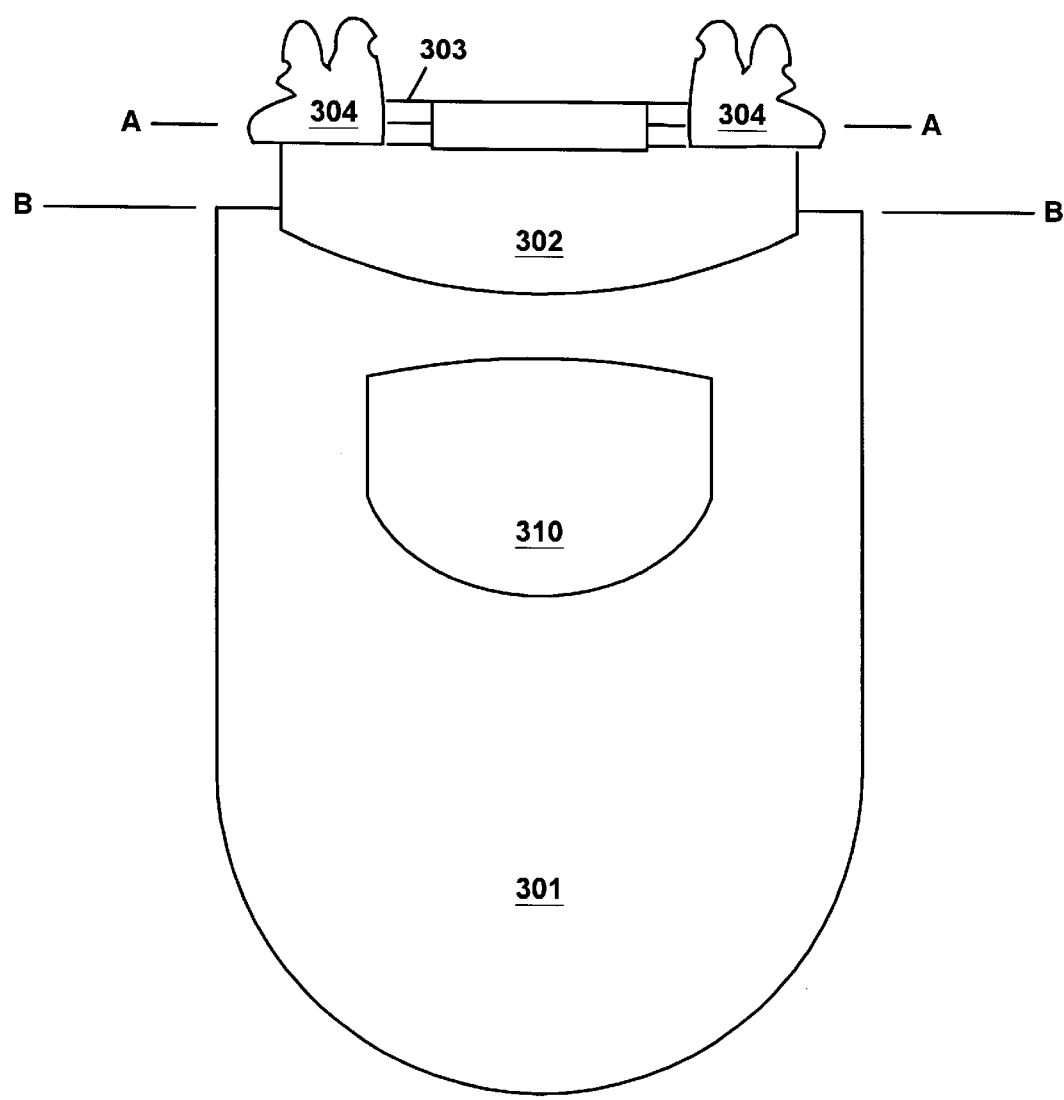
FIG. 9 is a rear view of a lid assembly in accordance with an embodiment of the present invention.

Referring now to FIG. 9, lid assembly 300 also includes pin 303. In the present embodiment, one clip 304 attaches to each end of pin 303. Pin 303 rotates about axis A—A relative to plate 302. This provides rotation as shown by arrow 363 of FIG. 8. Similarly, lid 301 rotates relative to plate 302 about axis B—B as shown by arrow 363 of FIG. 8.

Figure 10A:
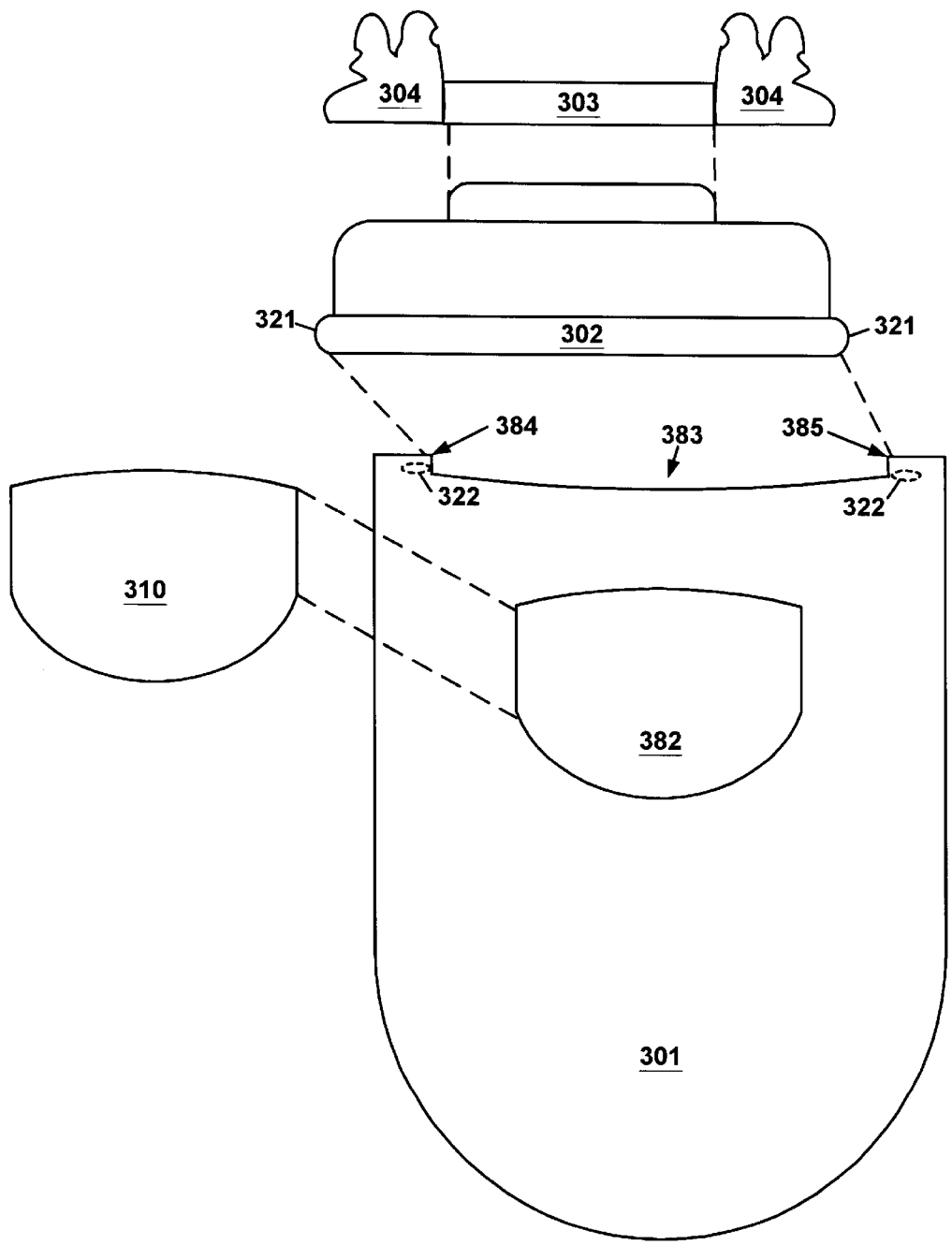
FIG. 10A is a front exploded view of a lid assembly in accordance with an embodiment of the present invention.

FIG. 10A shows an expanded view of the various components of lid assembly 300. In the embodiment shown in FIG. 10A, window pane 310 is formed of a non-opaque material that is transparent. In the present embodiment, window pane 310 is a clear piece of plastic that fits within opening 382 of lid 301 so as to form a window through which a portion of a display 105 of a portable computer 100 can be viewed while lid 301 is in the closed position. In one embodiment, opening 382 is sized so as to receive window pane 310 such that window pane 310 snaps into opening 382 so as to securely hold window pane 310 to lid 301. However, alternatively, lid 301 could be formed of a single piece of molded plastic that includes an opaque region and a non-opaque region. Also, opening 322 can remain unfilled so as to allow for unobstructed viewing therethrough.

Continuing with FIG. 10A, detents 321 extend from each side surface of plate 302. More particularly, detents 321 extend from each side surface of plate 302 near the bottom of plate 302. A recessed region 383 within the top of lid 301 forms side surfaces 384–385. Openings 322 extend partially within each of side surfaces 384–385. Each of openings 322 are adapted to receive detents 321 so as to secure plate 303 to lid 301 such that plate 302 rotates relative to lid 301.

Figure 10B:
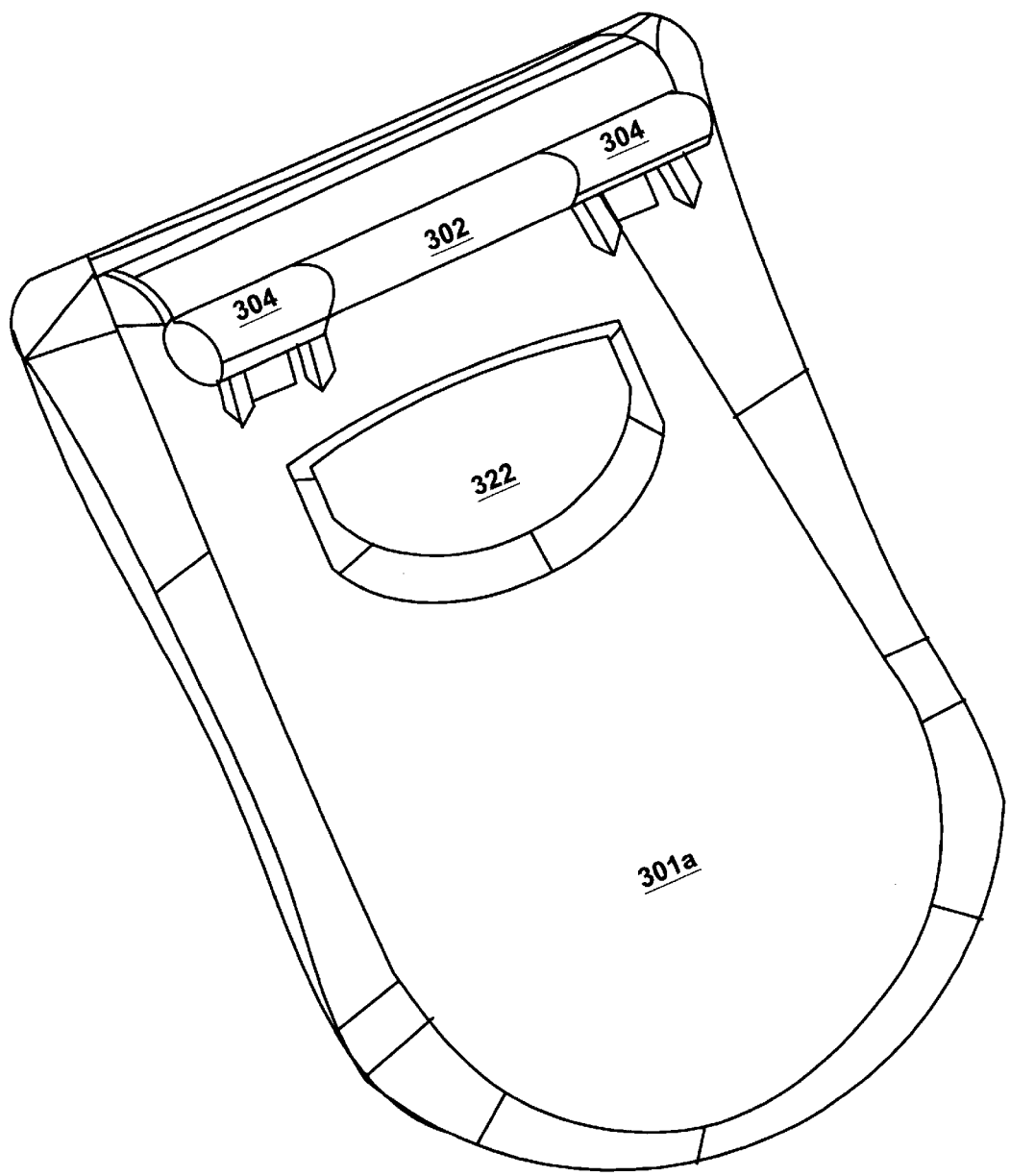
FIG. 10B is a front exploded view of a lid assembly in accordance with an embodiment of the present invention.

FIG. 10B shows an alternate embodiment of lid assembly 300a in which lid 301a includes opening 322. In the present embodiment, opening 322 remains open. That is, opening 322 does not receive clear plastic window pane 310 as shown in FIG. 10a.

Figure 10C:
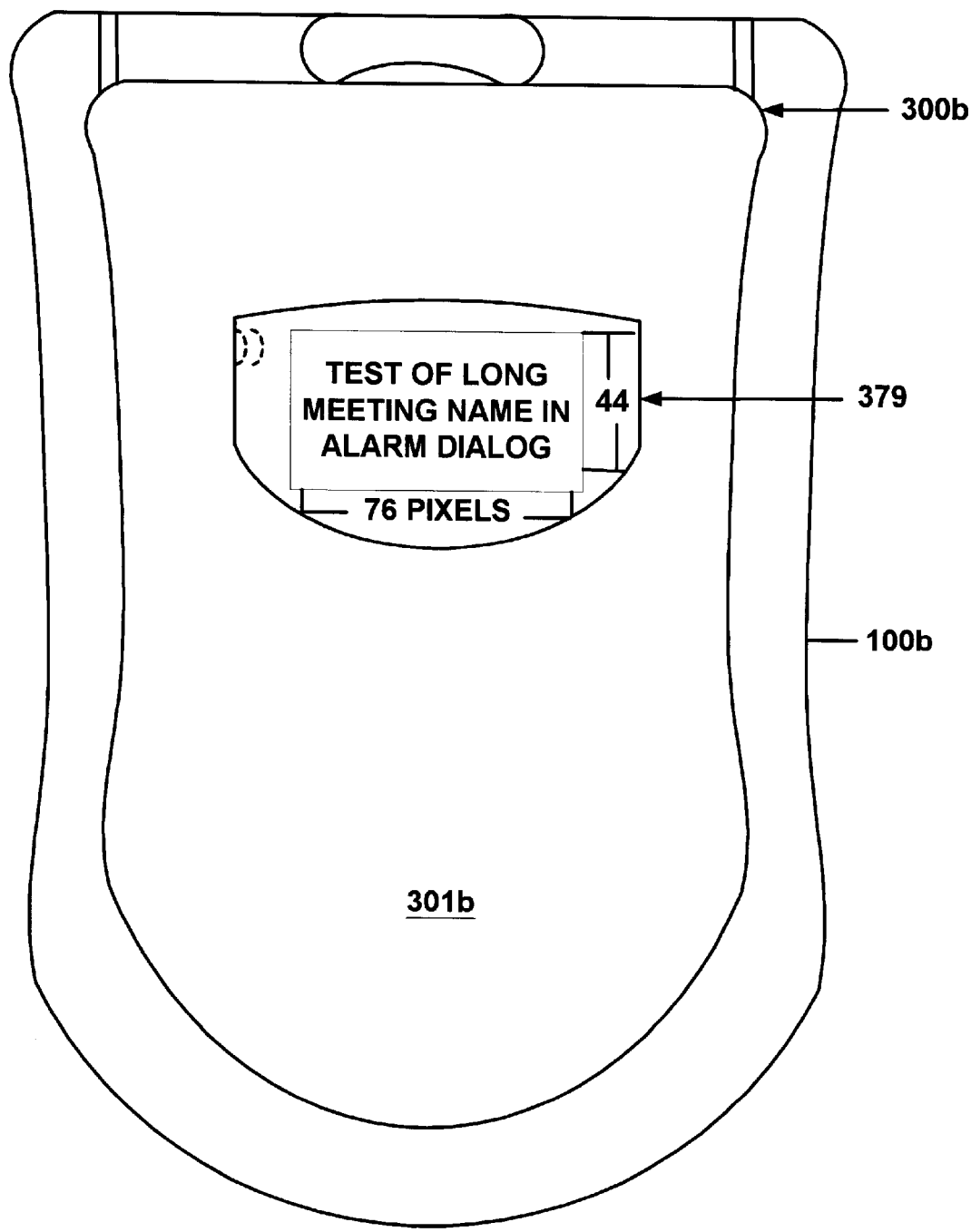
FIG. 10C is a front exploded view of a lid assembly in accordance with an embodiment of the present invention.

FIG. 10C shows an embodiment of the present invention in which lid assembly 300b attaches to a palmtop computer 100b that has a rounded bottom surface. In this embodiment, lid 301b includes opening 322 that exposes a portion of the display 105 of palmtop computer 100b when lid 301b is in the closed position. A window 379 is open on display 105. Opening 322 allows for viewing the text displayed in window 379 while lid 301b is in the closed position.

Figure 11:
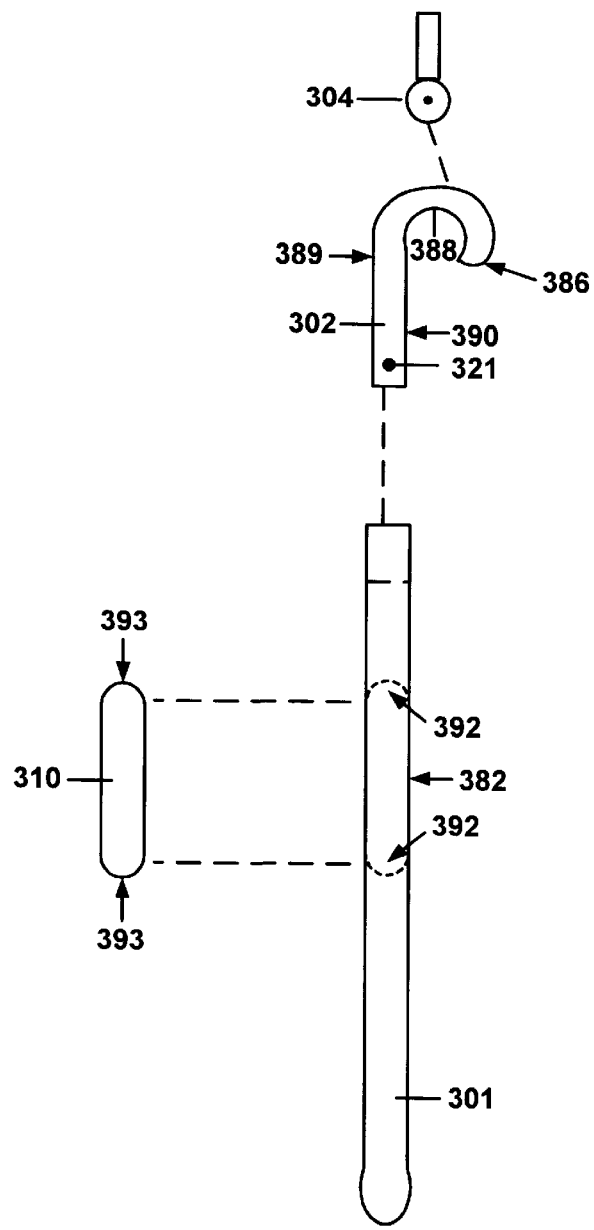
FIG. 11 is a right side exploded view of a lid assembly in accordance with an embodiment of the present invention.

Referring now to FIGS. 10A–11, front surface 389 of plate 302 is relatively flat. However, extending region 386 projects from the top end of rear surface 390 so as to form opening 388. Opening 388 is sized so as to receive pin 303. That is, the internal diameter of opening 388 is slightly greater than the diameter of pin 303. Assembly of pin 303 with plate 302 is accomplished by pressing pin 303 against extending region 386 near opening 388 such that pin 303 snaps into opening 388. Once pin 303 is assembled with plate 302, pin 303 is securely held within opening 388. However, because the internal diameter of opening 388 is slightly greater than the diameter of pin 303, pin 303 rotates within opening 388.

Referring now to FIG. 11, in the present embodiment, the side surfaces 392 of opening 382 are convex and correspond to the side surfaces 393 of window pane 310 that are concave. This allows window pane 310 to be easily attached to lid 301 by pressing window pane 310 against lid 310 such that window pane 310 snaps into opening 382. Because side surfaces 392 are convex, once window pane 310 is inserted into opening 382, window 301 is securely held in place.

Figure 12A:
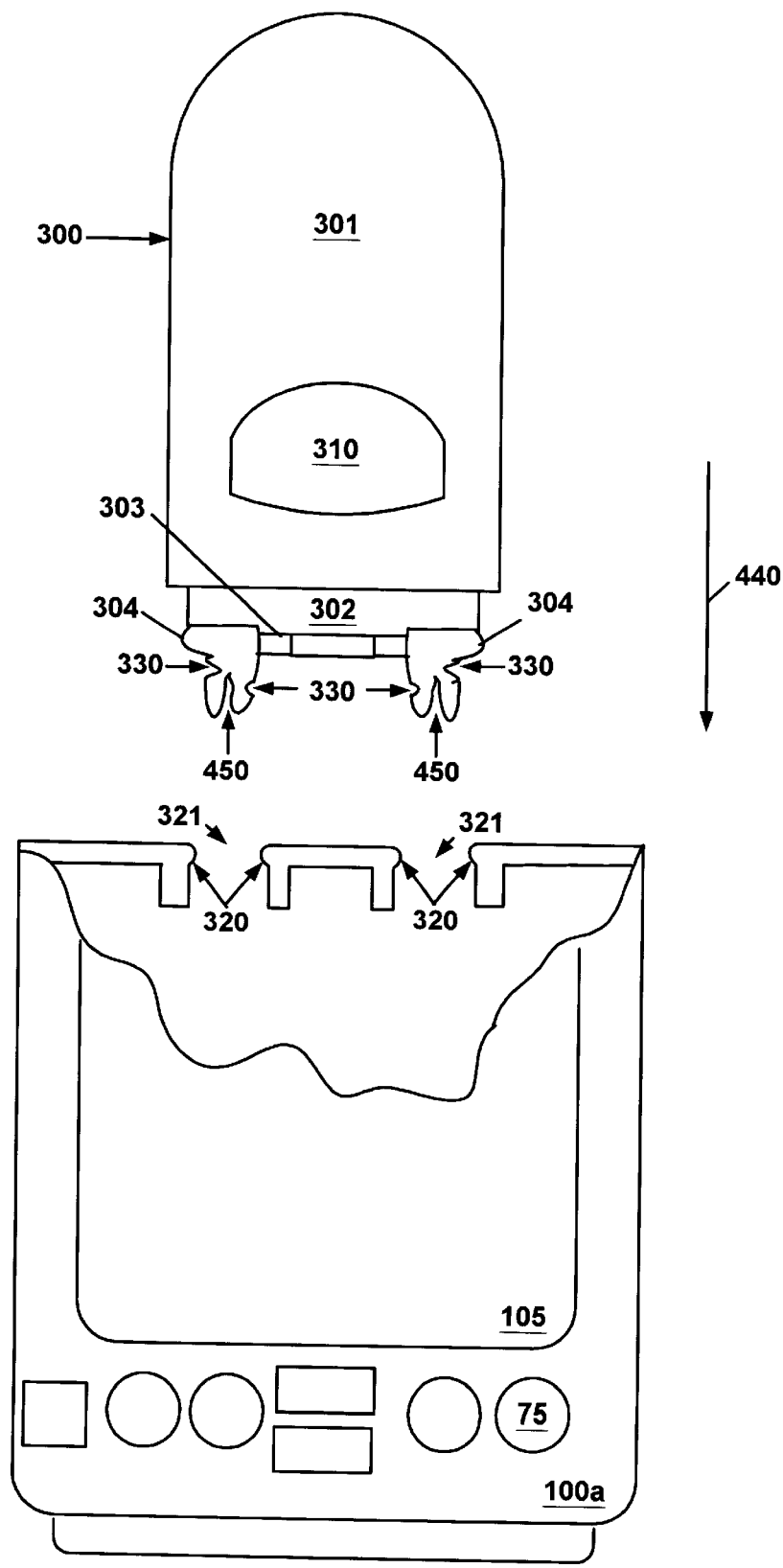
FIG. 12A illustrates the attachment of a lid assembly to a palmtop computer system in accordance with an embodiment of the present invention.
Figure 12B:
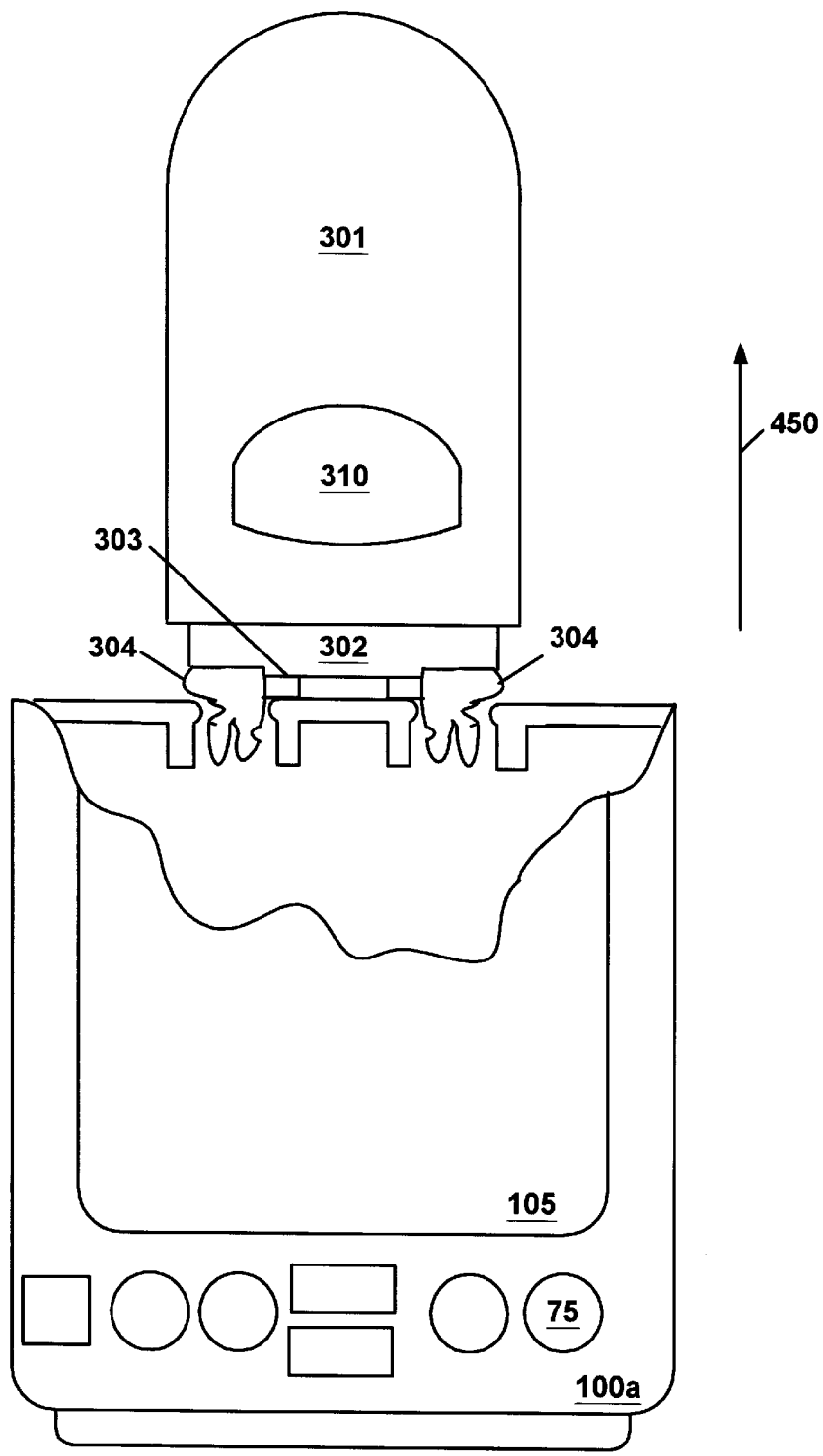
FIG. 12B shows a lid assembly that is attached to a palmtop computer system in accordance with an embodiment of the present invention.

FIGS. 12A–12B show the assembly of lid assembly 300 to palmtop computer system 100a. First lid 300 is aligned with palmtop computer system 100a such that each of clips 304 are aligned with one of openings 321. Lid assembly 300 is then moved as shown by arrow 440 such that each of clips 304 enter one of openings 321. Slots 450 within each of clips 304 form prongs 451 that deflect as each of clips 304 enter one of openings 321.

Referring now to FIG. 12B, when lid assembly 300 is fully engaged with palmtop computer system 100a, indentations 330 on each side surface of each of clips 304 engage detents 320 so as to securely hold lid assembly 300 to palmtop computer system 100a. Lid assembly 300 can be readily detached from palmtop computer system 100a by moving lid assembly 300 as shown by arrow 450 such that each of clips 304 are disengaged from one of openings 321.

Figure 13A:
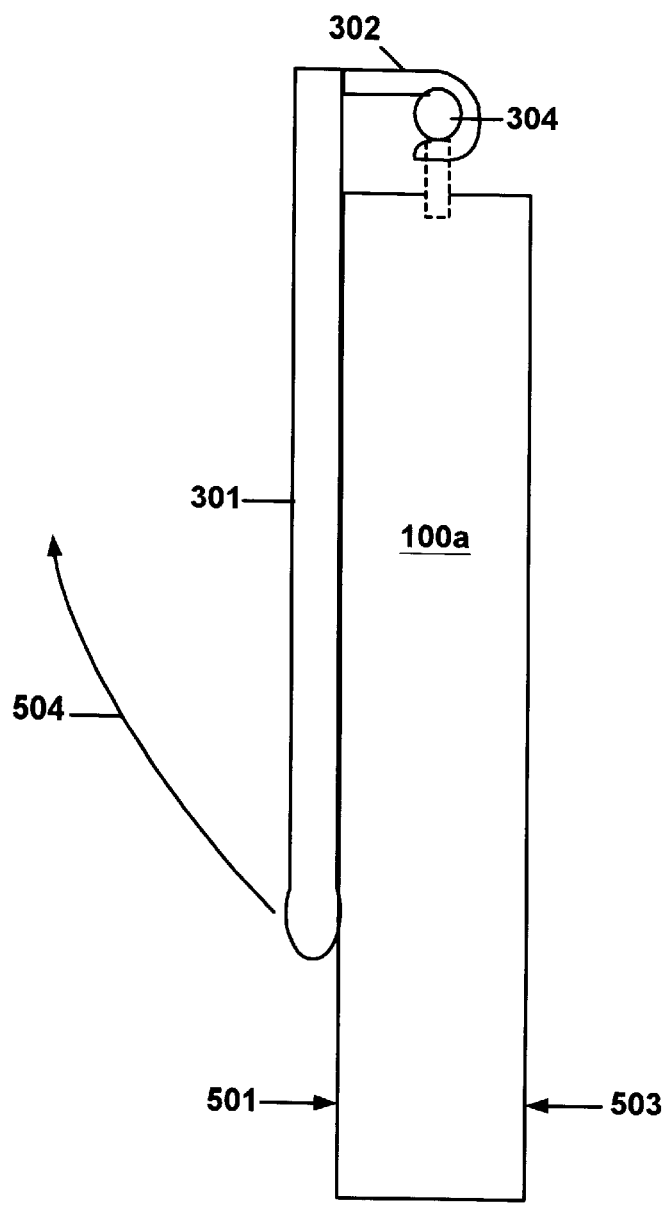
FIG. 13A illustrates operation of a lid assembly that is in the closed position and that is attached to a palmtop computer system in accordance with an embodiment of the present invention.
Figure 13B:
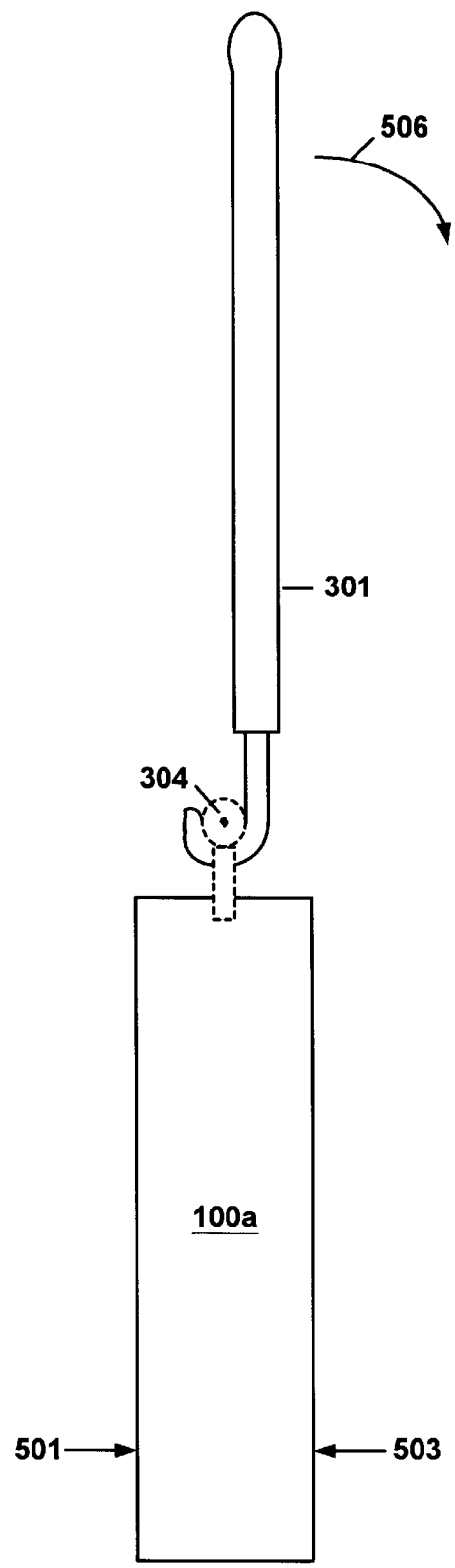
FIG. 13B illustrates operation of a lid assembly that is being moved from the closed position into the open position and that is attached to a palmtop computer system in accordance with an embodiment of the present invention.
Figure 13C:
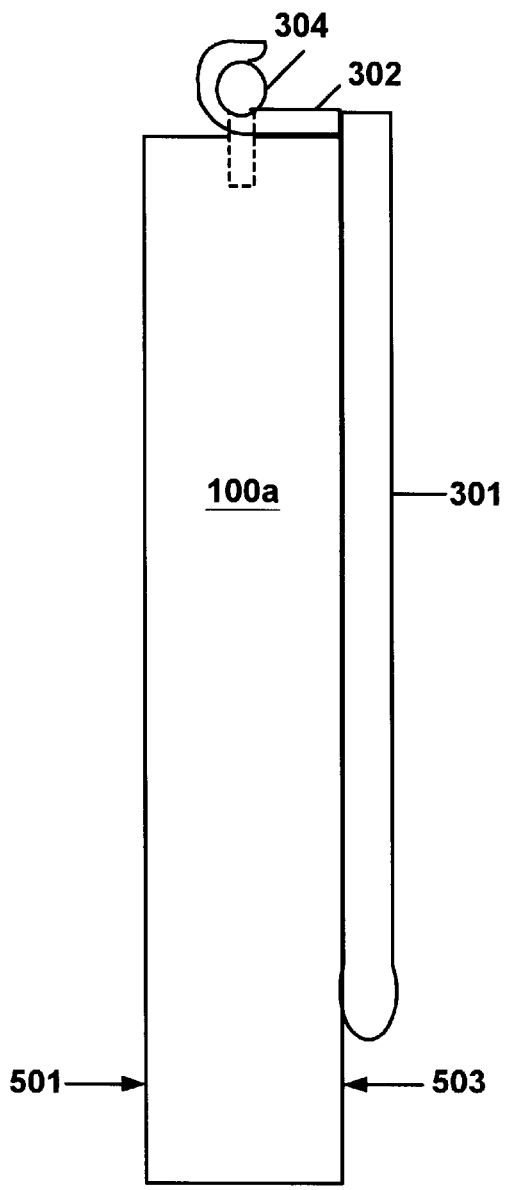
FIG. 13C illustrates operation of a lid assembly that is in the open position and that is attached to a palmtop computer system in accordance with an embodiment of the present invention.

FIGS. 13A–13C illustrate the operation of lid assembly 300. Referring now to FIG. 13A, in the present embodiment, lid 301 is aligned with and directly adjoins front surface 501 of palmtop computer system 100a when lid assembly 300 is in the closed position. In the closed position, lid 310 protects and partially covers the front surface 501 of palmtop computer system 100a. Lid assembly 300 is moved into the open position by moving lid 301 as shown by arrow 504. This pivots lid 310 about axis B—B and pivots plate 302 about axis A—A, moving lid assembly 300 into the position shown in FIG. 13B.

Referring now to FIG. 13B, continued movement of lid assembly 300 as shown by arrow 506 causes plate 302 to continue to rotate about axis A—A and causes lid 301 to continue to rotate about axis B—B, moving lid assembly 300 into the position shown in FIG. 13C. In the open position, lid 301 is aligned with and directly adjoins rear surface 503. This keeps lid 301 out of the way during the operation of palmtop computer system 100a. Also, because lid 310 fits against the rear surface 503, lid assembly 300 and palmtop computer system 100a provide a slim and compact profile that fits easily into a user's hand.

Still referring to FIGS. 13A–13C, in the open position, display 105 is uncovered and lid 301 is disposed against rear surface 503 of palmtop computer system 100a. Because lid 301 is disposed against rear surface 503 of palmtop computer system 100a, lid 301 is not in the way during the operation of palmtop computer system 100a. In addition, because lid 301 is disposed against rear surface 503 of palmtop computer system 100a, the palmtop computer system 100a can be easily grasped, holding lid 301 in the open position and allowing for easy operation of the palmtop computer system 100a.

Because lid 301 is held against the rear surface 503 of the palmtop computer system 100a when the palmtop computer system 100a is grasped by a user or when the palmtop computer system 100a is set down, lid 301 does not move so as to get in the user's way.

The embodiments of FIGS. 1–13C are shown to be implemented on a portable computer system 100 that is a palmtop computer. However, the present invention is well adapted for use with any type of electronic device, e.g., a portable computing device such as, for example, a laptop computer, a portable desktop computer, a Personal Digital Assistant (PDA), a combination digital telephone-and-computing device, a digital pager, a cell phone, a digital cell phone, etc.

The present invention provides a method and apparatus for covering a display of a portable computer system. The method and apparatus of the present invention is effective for protecting a display. Also, the method and apparatus of the present invention does not get in the way while the user is attempting to use the portable computer and/or view the display.

While the present invention has been described in particular embodiments, it should be appreciated that the present invention should not be construed as limited by such embodiments, but rather construed according to the below claims.

What is claimed is:

1. A lid assembly for covering a portable computer system having a display, said lid assembly comprising:
   a lid comprising an opaque region and a non-opaque region; and
   a coupling mechanism for coupling said lid to said portable computer system, said coupling mechanism operable to move said lid from a closed position to an open position, said lid covering said display when said lid is in said closed position, said non-opaque region allowing for viewing of a portion of said display when said lid is disposed in said closed position.

2. A lid assembly as recited in claim 1 wherein said lid further comprises a first piece of plastic having an opening disposed therein, said lid further comprising a second piece of plastic disposed within said opening in said first piece of plastic, said first piece of plastic being opaque and said second piece of plastic not being opaque such that a portion of said display is viewable when said lid is disposed in said closed position.

3. A lid assembly as recited in claim 1 wherein said lid is a single piece of molded plastic having an opaque region and a non-opaque region, said non-opaque region forming a viewing window for viewing a portion of said display when said lid is disposed in said closed position.

4. A lid assembly as recited in claim 1 wherein said coupling mechanism comprises:
   a plate having a first end and a second end, said plate rotatably coupled to said lid proximate said first end of said plate such that said lid rotates relative to said plate;

a first clip rotatably coupled to said plate proximate said second end of said plate, said first clip for coupling to said portable computer system; and a second clip rotatably coupled to said plate proximate said second end of said plate, said second clip for coupling to said portable computer system, said first clip and said second clip rotating relative to said plate such that said lid is movable from said closed position to said open position.

5. A lid assembly as recited in claim 1 wherein said lid has a front side and a rear side and wherein said portable computer system has a front side and a rear side, said coupling mechanism double-jointed so as to pivot about a first axis and a second axis such that said lid is disposed with said rear side of said lid is aligned with and directly adjoins said front side of said portable computer system when said lid is in said closed position, said lid movable such that said front side of said lid is aligned with and directly adjoins said rear side of said portable computer system when said lid is in said open position.

6. A lid assembly as recited in claim 4 wherein said lid has a front side and a rear side and wherein said palmtop computer system has a front side and a rear side, said lid movable such that lid is disposed with said rear side of said lid is aligned with and directly adjoins said front side of said portable computer system when said lid is in said closed position, said lid movable such that said front side of said lid is flush with said rear side of said portable computer system when said lid is in said open position.

7. A lid assembly as recited in claim 6 wherein said lid assembly couples to a palmtop computer system.

8. A method for covering a display of a portable computer system having a front surface and a display disposed in said front surface of said portable computer system, said method comprising the steps of:

a) providing a lid; and b) providing a double-jointed coupling mechanism that is coupled to said lid, said double-jointed coupling mechanism pivoting about a first axis and pivoting about a second axis for coupling said lid to said portable computer system, said double-jointed coupling mechanism operable to move said lid from a closed position to an open position, said lid covering at least a portion of said front surface of said portable computer system so as to protect said display when said lid is in said closed position.

9. A method as recited in claim 8 wherein said lid has a front side and a rear side and wherein said portable computer system has a front side and a rear side, said method further comprising the step of:

c) moving said lid from a closed position into an open position, said lid disposed with said rear side of said lid is aligned with and directly adjoins said front side of said portable computer system when said lid is in said closed position and said lid disposed such that said front side of said lid is aligned with and directly adjoins said rear side of said portable computer system when said lid is in said open position.

10. A method as recited in claim 9 further comprising the step of:

d) providing said portable computer, and wherein said portable computer is a palmtop computer having a first opening and a second opening disposed therein, said first opening and said second opening adapted to receive said double-jointed coupling mechanism.

11. A method as recited in claim 10 wherein said double-jointed coupling mechanism includes a first clip and a second clip and said method further comprises the steps of:

e) inserting said first clip into said first opening; and f) inserting said second clip into said second opening, said first clip and said second clip coupling to said palmtop computer so as to couple said lid assembly to said palmtop computer.

12. A lid assembly for a palmtop computer system that includes a display, said lid assembly comprising:

a lid;

a plate having a first end and a second end, said plate rotatably coupled to said lid proximate said first end of said plate such that said plate can rotate relative to said lid; and a first clip rotatably coupled to said plate proximate said second end of said plate for coupling to said palmtop computer system; and a second clip, said second clip rotatably coupled to said plate proximate said second end of said plate, said second clip for coupling to said palmtop computer system such that, when said first clip and said second clip are coupled to said palmtop computer system, said lid moves from a closed position to an open position, said lid covering said display when said lid is in said closed position and said lid uncovering said display when said lid is in said open position.

13. A lid assembly as recited in claim 12 wherein said lid comprises an opaque region and a non-opaque region, said non-opaque region allowing for viewing of a portion of said display when said lid is disposed in said closed position.

14. A lid assembly as recited in claim 13 wherein said lid further comprises a first piece of plastic having an opening disposed therein, said lid further including a second piece of plastic disposed within said opening in said first piece of plastic, said first piece of plastic being non-opaque and said second piece of plastic being opaque such that a portion of said display is viewable when said lid is disposed in said closed position.

15. A lid assembly as recited in claim 13 wherein said lid is a single piece of molded plastic having an opaque region and a non-opaque region, said non-opaque region forming a viewing window for viewing a portion of said display when said lid is disposed in said closed position.

16. A lid assembly as recited in claim 13 further comprising:

a pin coupled to said plate such that said pin rotates relative to said plate, said first clip and said second clip coupled to said pin such that said first clip and said second clip rotate with the rotation of said pin.

17. A lid assembly as recited in claim 13 wherein said lid comprises plastic.

18. A lid assembly as recited in claim 13 wherein said plate comprises plastic.

19. A lid assembly as recited in claim 13 wherein said first clip and said second clip comprise plastic.

20. A lid assembly as recited in claim 15 wherein said lid has a front side and a rear side and wherein said palmtop computer system has a front side and a rear side, said lid movable such that lid is disposed with said rear side of said lid is aligned with and directly adjoins said front side of said portable computer system when said lid is in said closed position, said lid movable such that said front side of said lid is aligned with and directly adjoins said rear side of said portable computer system when said lid is in said open position.

\* \* \* \* \*